United States Patent
Kombowski et al.

(10) Patent No.: US 8,434,602 B2
(45) Date of Patent: May 7, 2013

(54) TORQUE TRANSMISSION DEVICE

(75) Inventors: Eugen Kombowski, Buehl (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 591 days.

(21) Appl. No.: 12/315,339

(22) Filed: Dec. 2, 2008

(65) Prior Publication Data

US 2009/0084649 A1   Apr. 2, 2009

Related U.S. Application Data

(63) Continuation of application No. PCT/DE2007/000993, filed on Jun. 4, 2007.

(30) Foreign Application Priority Data

Dec. 18, 2006 (DE) .................. 10 2006 059 667

(51) Int. Cl.
*F16H 45/02* (2006.01)
(52) U.S. Cl.
USPC .............. 192/3.29; 192/70.18; 192/200
(58) Field of Classification Search .......... 192/70.18
See application file for complete search history.

(56) References Cited

U.S. PATENT DOCUMENTS

| | | | | |
|---|---|---|---|---|
| 3,871,499 A * | 3/1975 | Kazuma | ............. | 192/70.18 |
| 6,053,292 A * | 4/2000 | Macdonald | ............. | 192/3.3 |
| 6,085,882 A * | 7/2000 | Kimmig et al. | ............. | 192/70.18 |
| 6,293,380 B1 | 9/2001 | Arhab | | |
| 6,332,516 B1 | 12/2001 | Arhab | | |
| 2003/0089567 A1* | 5/2003 | Bauer et al. | ............. | 192/212 |
| 2004/0216972 A1* | 11/2004 | Tomiyama | ............. | 192/212 |

FOREIGN PATENT DOCUMENTS

JP   3-144153 A   6/1991

* cited by examiner

*Primary Examiner* — Rodney Bonck
(74) *Attorney, Agent, or Firm* — Simpson & Simpson, PLLC

(57) ABSTRACT

A torque transfer device in the drive train of a motor vehicle for transferring torque between a drive unit and a shaft rotatable about a rotation axis, including: a hydrodynamic torque converter, which includes a converter cover, connectable to the drive unit, and which can be coupled through a pump shell to a turbine shell for torque transfer, which can be bridged by a torque converter lockup clutch for torque transfer, which comprises a piston, movable in an axial direction within a range towards the cover in order to clamp a friction liner support with at least one friction liner between the piston and the cover for torque transfer. A friction ring is disposed between the piston and the friction liner support, and the friction ring is movable in an axial direction within a range between the piston and the friction liner support and connected to the converter cover.

9 Claims, 4 Drawing Sheets

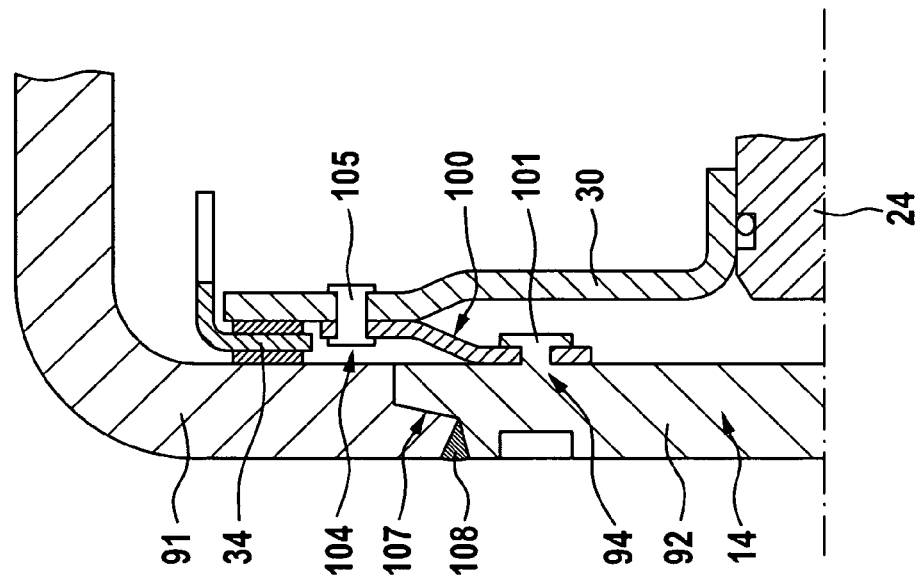
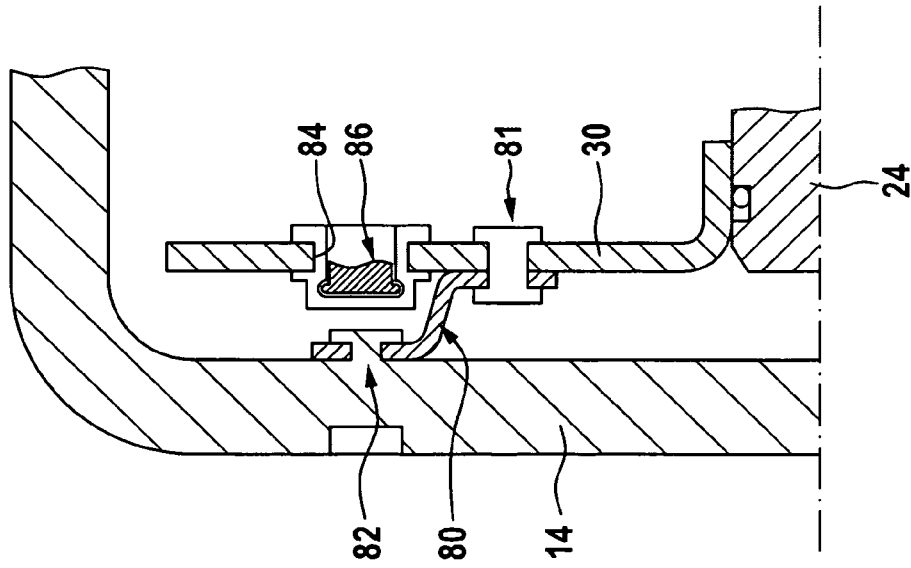

TORQUE TRANSMISSION DEVICE

CROSS-REFERENCE TO RELATED APPLICATIONS

This application is filed under 35 U.S.C. §120 and §365(c) as a continuation of International Patent Application PCT/DE2007/000993, filed Jun. 4, 2007, which application claims priority from German Patent Application No. 10 2006 059 667.6, filed Dec. 18, 2006, which applications are incorporated herein by reference in their entirety.

FIELD OF THE INVENTION

The invention relates to a torque transfer device, in particular in the drive train of a motor vehicle, for transferring torque between a drive unit and a shaft, which is rotatable about a rotation axis, in particular a transmission input shaft. The torque transfer device includes a hydrodynamic torque converter, which includes a converter cover, which can be connected or is connected to the drive unit, and which can be coupled through a pump shell to a turbine shell, in order to transfer torque. The turbine shell can be bridged by a converter lockup clutch, in order to transfer torque. The lockup clutch comprises a piston, which can be moved towards the converter cover within a range in axial direction, in particular in order to clamp a friction liner support including at least one friction liner between the piston and the converter cover for torque transfer. In one embodiment, the piston is mounted by a leaf spring device in a mounting portion at the converter cover. The invention furthermore relates to a method for mounting a torque converter device.

BACKGROUND OF THE INVENTION

It is the object of the invention to provide a torque converter device, which is simple in configuration and which can be produced economically.

The object is accomplished in a torque converter device by disposing a friction ring between a piston and a friction liner support, which can be moved within a range in axial direction between the piston and the friction liner support, and which is connected to the converter cover. Torque is transmittable from the cover to the friction ring by the connection. The torque transfer and pressure transfer functions, which are performed in the conventional torque transfer device by the piston alone, are divided between the piston and the friction ring. For example, the piston of the torque transfer device according to the invention only has the function of pressure transfer. The function of torque transfer is taken over by the friction ring, which can be clamped between the piston and the friction liner support.

BRIEF SUMMARY OF THE INVENTION

In one embodiment, the friction ring can be moved within a range in axial direction by a leaf spring device, and in that is connected torque proof to the converter cover. Torque is transmittable from the cover to the leaf spring device by the connection. The leaf spring device establishes a torque path between the piston and/or the friction ring and/or the converter cover. At the same time, the leaf spring device facilitates a movement within a range in axial direction between the piston and/or the friction ring and/or the converter cover.

In another embodiment, the leaf spring device includes plural leaf spring elements, which are disposed substantially in circumferential direction. The leaf spring elements are preferably configured as sheet metal components.

In a further embodiment, the leaf spring elements substantially have the configuration of circular arcs. In one embodiment, the leaf spring elements are disposed at even intervals on a pitch circle.

In one embodiment, the leaf spring elements respectively include a first mounting location, the leaf spring elements are attached at the converter cover, and a second mounting location, and the leaf spring elements are attached at the piston. The distance between the mounting locations is selected, so that a sufficient movement of the piston in axial direction relative to the converter cover is facilitated.

In another embodiment, the leaf spring elements respectively include a third mounting location and the leaf spring elements are attached at the friction ring. In one embodiment, the leaf spring elements are initially preassembled at the third mounting location at the friction ring.

In a further embodiment, the third mounting location is disposed, for example, in circumferential direction respectively between the first and the second mounting location. Thus, the assembly of the friction ring with the preassembled leaf spring elements is significantly simplified.

In one embodiment, the leaf spring elements comprise one pass-through hole per mounting location. The pass-through holes are used for passing mounting elements through for mounting the leaf spring elements.

In another embodiment, the friction ring substantially includes the shape of a circular annular disk. The friction ring is preferably provided as a sheet metal component.

In a further embodiment, the friction ring includes mounting ears at its inner circumference, which preferably extend radially inward and which are used for mounting the leaf spring device. In one embodiment, the friction ring includes one mounting ear per leaf spring element. In one embodiment, the mounting ears are integrally connected to the friction ring.

In a method for mounting a torque transfer device as described supra, the object described supra is achieved by the following assembly steps: initially the leaf spring device is attached to the friction ring; subsequently, the friction ring with the leaf spring device mounted thereon is inserted into the converter cover, in which the friction ring carrier is disposed; subsequently, the leaf spring device is mounted to the converter cover. Thereby, the production of the torque transfer device according to the invention is substantially simplified.

In one embodiment, the piston is subsequently mounted to the leaf spring device. The piston is preferably attached to the leaf spring device by means of lined rivets. The piston, however, can also be mounted to the leaf spring device by means of spring clips or bolts.

In a present invention torque transfer device, the converter cover includes a radially outer cover component and a radially inner cover component, at which a radially inner mounting portion of a leaf spring device is mounted, which is mounted to the piston by a radially outer mounting portion. Mounting the leaf spring device at the radially outer cover component and/or the radially inner cover component is preferably performed by rivet connector elements, e.g. by rivet buds, which are pressed out of the converter cover. The assembly of the torque transfer device is simplified by the two component configuration of the converter cover.

In one embodiment, the radially outer mounting portion of the leaf spring device is disposed radially outside of an interface between the radially outer cover portion and the radially inner cover portion. The interface preferably extends in circumferential direction.

In another embodiment, the radially outer cover portion is bonded or connected in a form locking manner with the radially inner cover portion. The form locked connection is used for positioning the two cover portions, which are preferably bonded to one another through welding.

In a further embodiment, the mounting portion is accessible through a pass-through hole in the piston from the side facing away from the drive unit. Thus, the assembly of the piston at the converter cover is simplified.

BRIEF DESCRIPTION OF THE SEVERAL VIEWS OF THE DRAWING

Additional advantages, features and details of the invention can be derived from the subsequent description, in which various embodiments are described in detail with reference to the drawing. It is shown in:

FIG. 5 a present invention torque transfer device in a semi-sectional view; and FIG. 6 a present invention torque transfer device in a semi-sectional view.

DETAILED DESCRIPTION OF THE INVENTION

Figure 1:
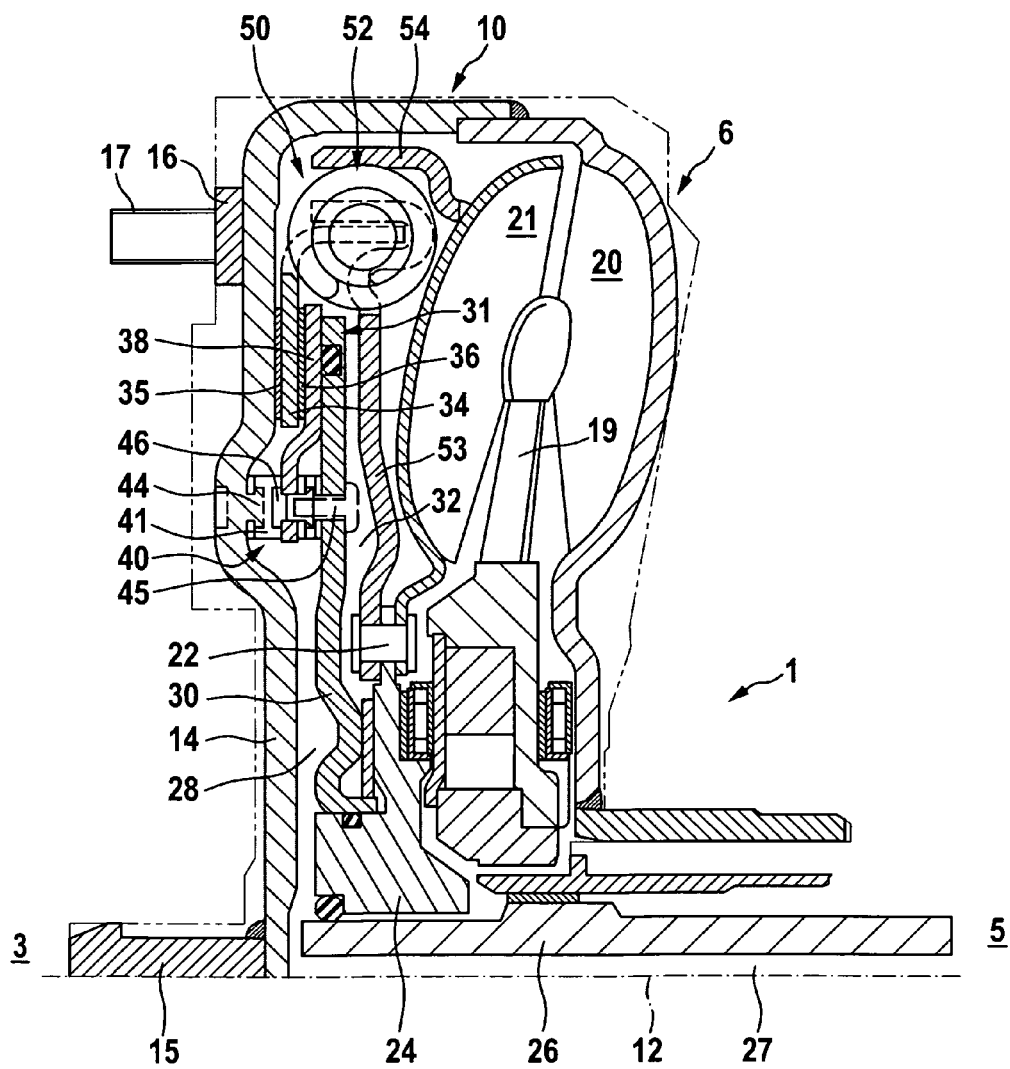
FIG. 1 a present invention torque transfer device in a semi-sectional view.
Figure 4:
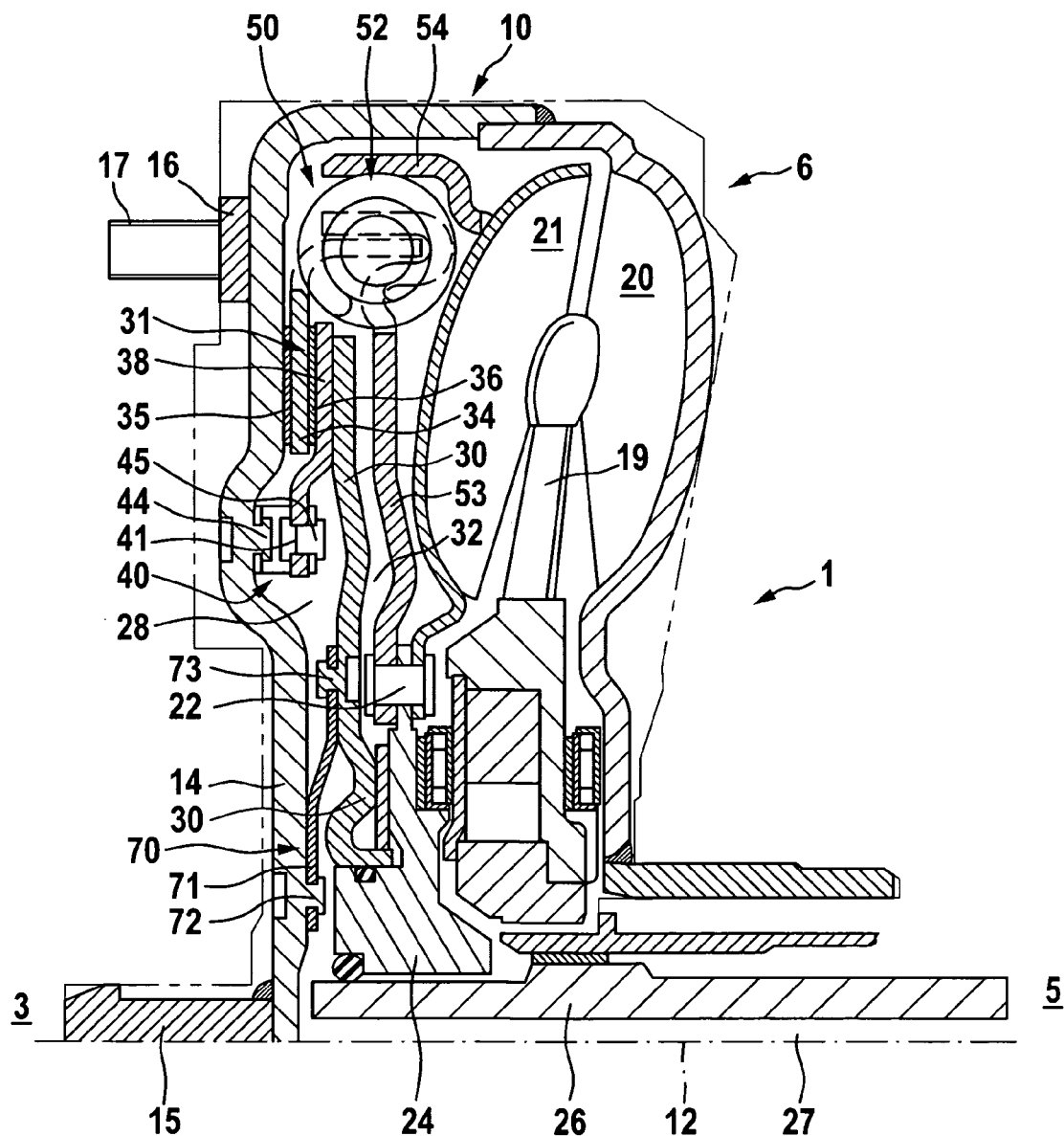
FIG. 4 a present invention torque transfer device in a semi-sectional view.

In FIGS. 1 and 4, a respective portion of drive train 1 of a motor vehicle is illustrated. Between drive unit 3, for example, a combustion engine, which is only indicated by a reference numeral, and from which a crankshaft extends, and transmission 5, which is also only indicated by a reference numeral, hydrodynamic torque converter 6 is disposed. The crankshaft of combustion engine 3 is connected to housing 10 of torque converter 6, e.g. by a drive plate, which is also designated as a flex plate. Torque is transmitted from the crankshaft to the housing by the connection. The housing of the torque converter is rotatable about rotation axis 12 and includes housing wall 14, which is proximal to the drive. The housing wall is also designated as the converter cover.

Central pilot boss 15 is mounted in the converter cover, and the pilot boss is configured to center hydrodynamic torque converter 6 in a preliminary manner when mounted in a central recess of the crankshaft. On the radial outside, connection plate 16 is mounted to converter cover 14, and threaded bolts 17 extend from converter cover 14 by means of which the converter cover 14 is mounted to the drive plate.

Hydrodynamic torque converter 6 includes stator shell 19, pump shell 20 and turbine shell 21. The turbine shell 21 is fixed at hub component 24 by rivet connector elements 22. The hub component is connected to a transmission input shaft 26, which internally comprises a central pass-through cavity 27. Torque is transmittable by the connection. Cavity 27 is connected to cavity 28, which is defined by converter cover 14 towards drive unit 3 and defined by piston 30 towards transmission 5. The piston is associated with converter lockup clutch 31, which is used for bridging the hydrodynamic torque converter 6. The piston defines pressure cavity 32 with its side facing transmission 5. The pressure cavity can be loaded with pressure through a hydraulic medium in order to actuate converter lockup clutch 31. When actuated, piston 30 moves towards converter cover 14. In case of such movement in an axial direction, a medium included in cavity 28 is displaced and drained through cavity 27.

The converter lockup clutch includes friction liner support 34 where friction liners 35, 36 are mounted. Friction liner 35 contacts converter cover 14 when piston 30 is actuated. Friction ring 38 contacts friction liner 36 when piston 30 is actuated. Friction ring 38 is disposed in an axial direction between friction liner 36 or friction liner support 34 and piston 30. Friction ring 38 is mounted by a leaf spring device 40, which includes several leaf spring elements 41, to converter cover 14, so that the friction ring can move in axial direction within a range. Torque is transmittable from the cover to the ring via the leaf spring device.

In the torque transfer device illustrated in FIG. 1, one end of leaf spring 41 is mounted at converter cover 14 at mounting location 44. The mounting at mounting location 44 is preferably performed by a rivet bud, which is pressed out of converter cover 14. At mounting location 45, the other end of leaf spring 41 is mounted at piston 30, for example, by means of a blind rivet. At mounting location 46, which is disposed between mounting location 44 and mounting location 45, leaf spring 41 is mounted to friction ring 38. Mounting of friction ring 38 at leaf spring 41 is, for example, performed by a rivet connector element.

Friction liner support 34 forms the input component of torsion vibration damper 50, which is disposed in housing 10 between converter cover 14 and turbine shell 21. The input component or friction liner support 34 is coupled to output component 53 of torsion vibration damper 50 through energy accumulator elements. Output component 53 is mounted to hub component 24 by means of rivet connector elements 22. Radially outside of energy storage elements 52, flywheel mass 54 is mounted to turbine shell 21.

Figure 2:
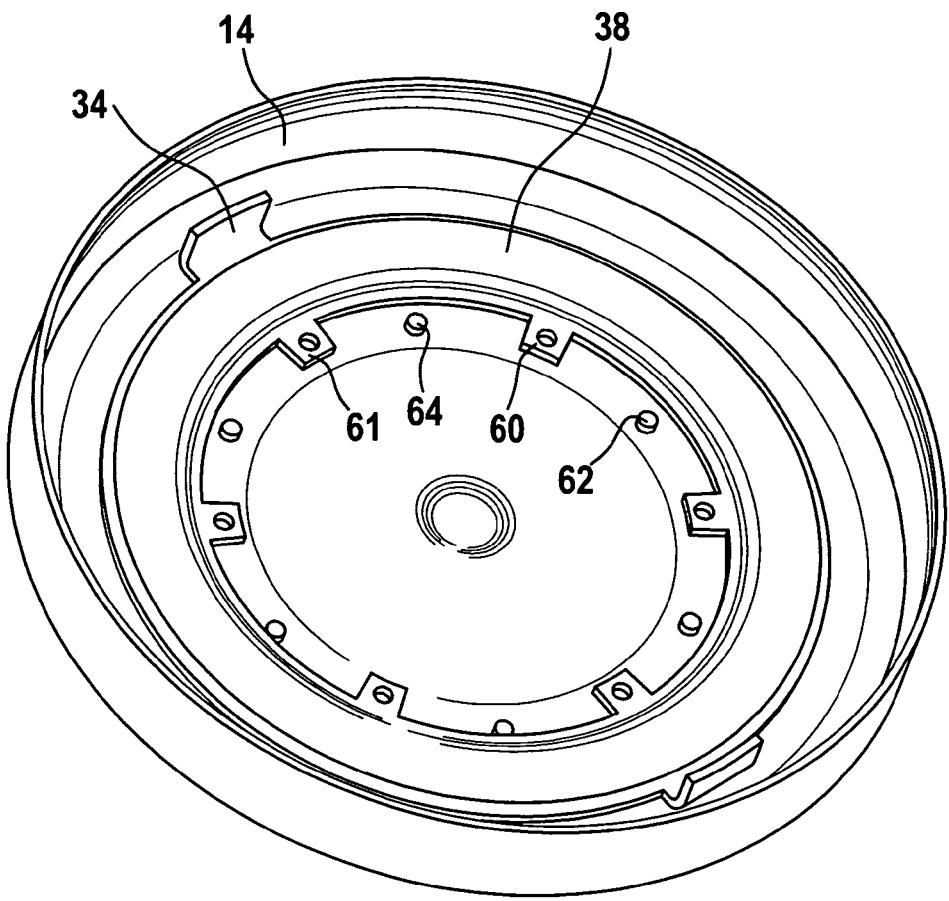
FIG. 2 a perspective illustration of the converter cover of the torque transfer device illustrated in FIG. 1 including an inserted liner support and an inserted friction ring.

As shown in FIG. 2, friction ring 38 has the configuration of a circular annular disk, from which six mounting ears 60, 61 extend towards the radial inside. Each of mounting ears 60, 61 includes a pass-through hole for passing a mounting element through. In circumferential direction between two ears 60, 61, one respective rivet bud 62, 64 is disposed, which is pressed out of converter cover 14.

Figure 3:
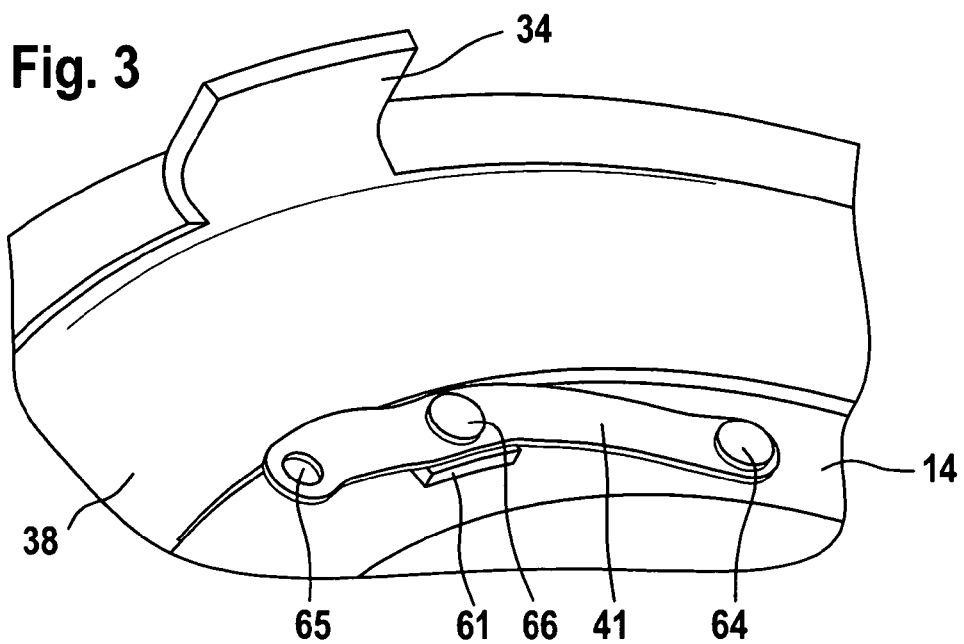
FIG. 3 an enlarged detail of FIG. 2 comprising a leaf spring element.

As shown in FIG. 3, rivet bud 64 is used for mounting one end of leaf spring element 41. For this purpose, leaf spring element 41 includes a pass-through hole, through which the rivet buds 64 extend. Another pass-through hole 65 is provided at the other end of leaf spring element 41. The pass-through hole is used for passing a blind rivet through, by means of which the associated end of leaf spring element 41 is mounted to piston 30 as illustrated in FIG. 1. Approximately in the center of leaf spring element 41, the leaf spring element includes another pass-through hole, through which the rivet buds 66 extend, by means of which leaf spring element 41 is mounted to the mounting ear 61, which extends from friction ring 38.

The assembly of the torque transfer device illustrated in FIGS. 1 through 3 is performed as described infra. Initially leaf spring elements 41 are mounted at the center hole at friction ring 38. The preassembled assembly is then inserted into converter cover 14, in which friction liner support 34 is already disposed, and subsequently the assembly is riveted into the converter cover. For this purpose, rivet buds 62, 64 are provided in converter cover 14. As a next step, piston 30 is mounted. The connection of piston 30 to leaf springs 41 can be performed by blind rivets, spring clips or bolts, wherein rivet nuts have to be fastened for the bolts at the leaf spring elements.

As shown in FIG. 4, piston 30, instead of being connected to the same leaf spring elements as friction ring 38, can also be directly connected to converter cover 14 through another leaf spring device 70, which includes plural leaf spring elements 71. In this case leaf springs 71 are initially preassembled at connection spot 73 at piston 30. After friction liner support 34 is inserted, and friction ring 38 is riveted on, piston 30 with preassembled leaf springs 71 is inserted. Subsequently, the radial inner ends of leaf springs 71 are riveted through a central opening in piston 30 to converter cover 14 at connection spot 72. For this purpose, rivet buds are provided at converter cover 14 at connection spot 72. The leaf spring device can also alternatively be provided as a disk.

The following additional embodiments are possible: leaf springs with a cover or with a friction ring, e.g. bolted together using rivet nuts or welded together; leaf spring, e.g. bolted together with the piston, using rivet nuts or welded together; leaf springs connected to the piston or to the cover through spring elements like clips.

As shown in FIG. 5, piston 30 can also be directly mounted to converter cover 14 through leaf spring device 80. The leaf spring device is mounted to piston 30 in mounting portion 81. In mounting portion 82, which is disposed radially outside of mounting portion 81, leaf spring device 80 is mounted to the mounting portion by means of a rivet bud, which is pressed out of converter cover 14. Mounting portion 82 is accessible through pass-through hole 84, which is recessed in piston 30.

The torque transfer device illustrated in FIG. 5 is mounted as follows: initially, the leaf spring device, which comprises several leaf spring elements, is riveted to piston 30 at mounting portion 81. The preassembled assembly is then inserted into the converter cover and riveted through pass-through hole 84 to the rivet buds in mounting portion 82. Subsequently, openings 84 in piston 30 are closed by blind rivet elements or sealing blind rivets 86.

In FIG. 6, a torque converter device is illustrated in a semi-sectional view, in which converter cover 14 includes radially outer sheet metal component 91 and radially inner sheet metal component 92. At radially inner sheet metal component 92, leaf spring device 100 is mounted in radially inner mounting portion 94. Mounting leaf spring device 100 in radially inner mounting portion 94 is, for example, performed by rivet bud 101, which is pressed out of converter cover 14. In radially outer mounting portion 104, leaf spring device 100 is mounted to piston 30 by means of rivet connection elements 105. Radially outer mounting portion 104 is disposed radially outside of form locking portion 107, which is configured between cover components 91, 92. The form locked portion is used for preassembling the two cover components. Connecting cover components 91, 92 is performed by weld 108.

When mounting the torque converter device which is only illustrated in semi-sectional view in FIG. 6, initially leaf spring device 100 is riveted to radially inner cover component 92. Subsequently, piston 30 is riveted to leaf spring device 100. Subsequently, the preassembled assembly is inserted into radially outer cover component 91 together with radially inner cover component 92 and friction liner support 34. Subsequently, the two cover portions 91 are welded together.

REFERENCE NUMERALS AND DESIGNATIONS 1 drive train
3 drive unit
5 transmission
6 hydrodynamic torque converter
10 housing
12 rotation axis
14 housing wall
15 pilot boss
16 connection plate
17 threaded bolt
19 stator shell
20 pump shell
21 turbine shell
22 rivet connector elements
24 hub component
26 transmission input shaft
27 inner cavity
28 cavity
30 piston
31 torque converter lockup clutch
32 pressure cavity
34 friction liner support
35 friction liner
36 friction liner
38 friction ring
40 leaf spring device
41 leaf spring
44 first mounting spot
45 second mounting spot
46 third mounting spot
50 torsion vibration damper
52 energy accumulator elements
53 output component
54 flywheel mass
60 mounting ear
61 mounting ear
62 rivet bud
64 rivet bud
65 pass-through hole
66 rivet connector element
70 leaf spring device
71 leaf springs
72 connection spot
73 connection spot
80 leaf spring device
81 first mounting portion
82 second mounting portion
84 pass-through hole
86 blind rivet elements
91 radially outer sheet metal component
92 radially inner sheet metal component
94 radially inner mounting portion
100 leaf spring device
101 rivet bud
104 radially outer mounting portion
105 rivet connector elements
107 form locking portion
108 weld

What is claimed is:

1. A torque transfer device in the drive train of a motor vehicle for transferring torque between a drive unit (3) and a shaft (26) rotatable about a rotation axis (12), comprising: a hydrodynamic torque converter (6), which comprises a damper with at least one spring, a converter cover (14), connectable to the drive unit (3), and which can be coupled through a pump shell (20) to a turbine shell (21) for torque transfer, which can be bridged by a torque converter lockup clutch (31) for torque transfer, which comprises a piston (30), which can be moved in an axial direction within a range towards the converter cover (14) in order to clamp a friction liner support (34) with at least one friction liner (35, 36) between the piston (30) and the converter cover (14) for torque transfer, wherein:
- a friction ring (38) is disposed between the piston (30) and the friction liner support (34);
- said friction ring is movable in an axial direction within a range between the piston (30) and the friction liner support (34) and connected to the converter cover (14) for torque transfer;
- the piston (30) is moveable to contact the friction ring (38) to displace the friction ring (38) so that the friction ring (38) engages with the friction liner (36) located between the friction ring (38) and the friction liner support (34);
- the friction liner support (34) is in direct contact with the at least one spring;
- the friction ring (38) is movable in the axial direction by a leaf spring device (40) within the range, leaf spring device (40) connected to the converter cover (14) for torque transfer;
- the leaf spring device (40) comprises plural leaf spring elements (41), which are substantially disposed in circumferential direction;
- wherein the leaf spring elements (41) each comprise a first mounting spot (44), where the leaf spring elements (41) are mounted to the converter cover (14) and comprise a second mounting spot (45), where the leaf spring elements (41) are mounted to the piston (30);
- the leaf spring elements (41) respectively comprise a third mounting spot (46), where the leaf spring elements (41) are mounted to the friction ring (38); and
- the third mounting spot (46), in a circumferential direction, is disposed respectively between the first mounting spot (44) and the second mounting spot (45).

2. The torque transfer device according to claim 1, wherein the leaf spring elements (41) substantially comprise the shape of circular arcs.

3. The torque transfer device according to claim 1, wherein the leaf spring elements (41) comprise one pass-through hole per mounting spot (44-46).

4. The torque transfer device according to claim 1, wherein the friction ring (38) substantially comprises the configuration of a circular annular disk.

5. The torque transfer device according to claim 1, wherein the friction ring (38) at its inner circumference comprises radially inward extending mounting ears (60, 61), which are used for mounting the leaf spring device (40).

6. The torque transfer device according to claim 1, wherein the shaft (26) is a transmission input shaft.

7. A method for assembling a torque transfer device according to claim 1, comprising the following assembly steps:
- mounting the leaf spring device (40) to a friction ring (38);
- inserting the friction ring (38), including the leaf spring device (40) mounted thereon, into the converter cover (14), in which the friction liner support (34) is disposed; and
- mounting the leaf spring device (40) to the converter cover (14).

8. The method according to claim 7, further comprising mounting the piston (30) to the leaf spring device (40).

9. A torque transfer device in the drive train of a motor vehicle for transferring torque between a drive unit (3) and a shaft (26) rotatable about a rotation axis (12), comprising: a hydrodynamic torque converter (6), which comprises a damper with at least one spring, a converter cover (14), connectable to the drive unit (3), and which can be coupled through a pump shell (20) to a turbine shell (21) for torque transfer, which can be bridged by a torque converter lockup clutch (31) for torque transfer, which comprises a piston (30), which can be moved in an axial direction within a range towards the converter cover (14) in order to clamp a friction liner support (34) with at least one friction liner (35, 36) between the piston (30) and the converter cover (14) for torque transfer, wherein a friction ring (38) is disposed between the piston (30) and the friction liner support (34), wherein said friction ring is movable in an axial direction within a range between the piston (30) and the friction liner support (34) and connected to the converter cover (14) for torque transfer, and wherein the piston (30) is moveable to contact the friction ring (38) to displace the friction ring (38) so that the friction ring (38) engages with the friction liner (36) located between the friction ring (38) and the friction liner support (34) and wherein:
- the friction liner support (34) is in direct contact with the at least one spring;
- the friction ring is connected to the cover and the piston with a leaf spring; and,
- respective connection points between a first leaf spring portion and the cover and friction ring and between a second leaf spring portion and the friction ring and piston are at a same radial distance from the rotation axis.

* * * * *